(12) United States Patent
Van Schaik

(10) Patent No.: US 8,610,965 B2
(45) Date of Patent: Dec. 17, 2013

(54) REPRODUCTION DEVICE, ASSEMBLY OF A REPRODUCTIVE DEVICE AND AN INDICATION BODY, AND A METHOD FOR REPRODUCING AN IMAGE PORTION

(75) Inventor: Michiel Jeroen Van Schaik, Breda (NL)

(73) Assignee: Optelec Development B.V., Barendrecht (NL)

( * ) Notice: Subject to any disclaimer, the term of this patent is extended or adjusted under 35 U.S.C. 154(b) by 1094 days.

(21) Appl. No.: 12/315,018

(22) Filed: Nov. 25, 2008

(65) Prior Publication Data

US 2009/0296162 A1 Dec. 3, 2009

Related U.S. Application Data

(60) Provisional application No. 61/004,286, filed on Nov. 26, 2007.

(51) Int. Cl.
*G09G 3/20* (2006.01)
*H04N 1/00* (2006.01)

(52) U.S. Cl.
USPC .............................. 358/474; 358/401; 345/55

(58) Field of Classification Search
USPC ....................... 358/401–498; 600/427; 345/55
See application file for complete search history.

(56) References Cited

U.S. PATENT DOCUMENTS

| | | | | |
|---|---|---|---|---|
| 5,430,557 A | * | 7/1995 | Tamura et al. | 358/3.06 |
| 5,511,148 A | * | 4/1996 | Wellner | 358/1.6 |
| 6,167,296 A | * | 12/2000 | Shahidi | 600/427 |
| 6,490,477 B1 | * | 12/2002 | Zylka et al. | 600/429 |
| 7,558,439 B2 | * | 7/2009 | Weese et al. | 382/294 |
| 7,646,379 B1 | * | 1/2010 | Drennan et al. | 345/177 |
| 2004/0240735 A1 | * | 12/2004 | Medina | 382/173 |
| 2005/0233287 A1 | * | 10/2005 | Bulatov et al. | 434/114 |
| 2006/0232496 A1 | * | 10/2006 | Sato | 345/1.3 |

* cited by examiner

*Primary Examiner* — Qian Yang
(74) *Attorney, Agent, or Firm* — Husch Blackwell LLP

(57) ABSTRACT

Reproduction device, including registration means arranged to optically register an image portion that is to be registered of an image. The reproduction device includes electronic signal processing means arranged to process a registered image portion, and includes and/or is connectable with reproduction means arranged to reproduce a processed registered image portion. The reproduction device is provided with localisation means arranged to determine a position of an indication body that is moveable with respect to the image and with respect to at least a part of the reproduction device. The reproduction device is arranged to relate a position of the image portion that is to be registered to the position of the indication body.

38 Claims, 14 Drawing Sheets

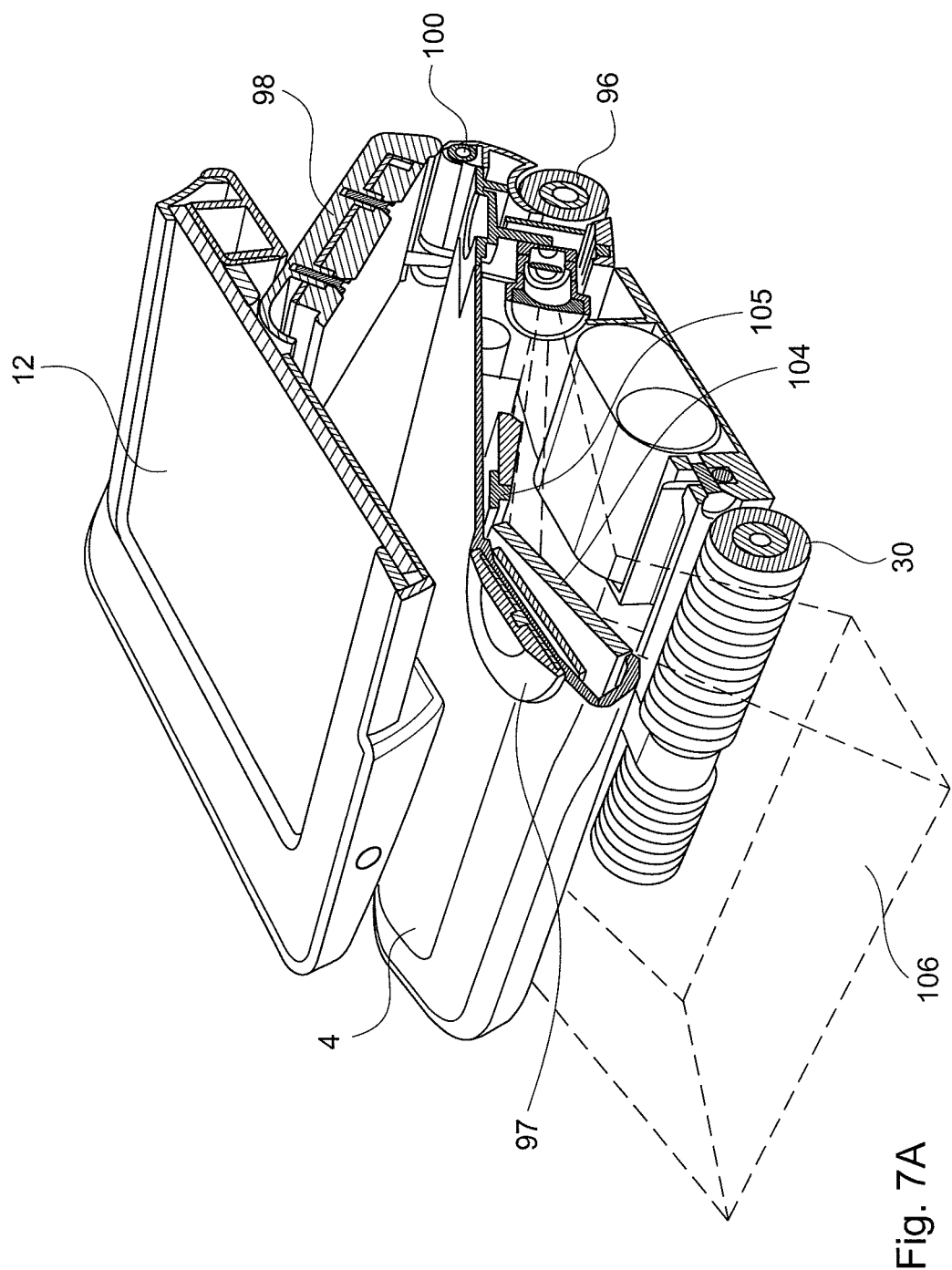

REPRODUCTION DEVICE, ASSEMBLY OF A REPRODUCTIVE DEVICE AND AN INDICATION BODY, AND A METHOD FOR REPRODUCING AN IMAGE PORTION

The invention relates to a reproduction device, including registration means arranged to optically register an image portion that is to be registered of an image, the reproduction device including electronic signal processing means arranged to process at least a registered image portion, and including and/or being connectable with reproduction means arranged to reproduce a processed registered image portion. The image portion and the image that includes the image portion can for example include a text or a picture on a piece of paper, or a text in braille, or an image on a display.

An example of a known reproduction device is an electronic magnifier, which can for example be used by persons with impaired vision as reading aid to magnify words. By moving such an electronic magnifier over a book, text in the book can be read line by line. Moving the electronic magnifier along a line, and subsequently back and downwards to a next line, can be inconvenient after a while because it requires a certain amount of muscle power in a repeated motion. Furthermore, finding the beginning of the next line can be problematic.

It is an object of the invention to provide an improved reproduction device, which at least partly solves one or more problems of known reproduction devices.

The invention provides a reproduction device characterised in that the reproduction device is provided with, preferably contactless, localisation means arranged to determine a position of an indication body that is moveable with respect to the image and with respect to at least a part of the reproduction device, and in that the reproduction device is arranged to select a position of the image portion that is to be registered relative to the image in response to the determioned position of the indication body. The indication body can for example include a finger of a user of the reproduction device, or a pointing stick operated by the user, or an object such as a pen. An advantage of such a reproduction device is that successive parts of a line of text can be reproduced without having to move the reproduction device along the line. Because of this the user can have a relatively comfortable and/or ergonomic position with respect to the reproduction device, because muscle power necessary for moving the indication body is relatively small. In addition, orientation in the text, in particular following the line and finding the beginning of a next line after the end of the line has been reached, is easier. Preferably, the localisation means are arranged to determine the position of the indication body along a first imaginary axis along which a camera can move, the camera being included by the registration means. More preferably, the localisation means are arranged to determine a direction of movement and/or velocity of the indication body. The first imaginary axis is preferably directed parallel to a line of text included by the image. Thus, successive parts of a line of text can be reproduced without having to move the reproduction device along the line in a simple manner.

In particular, the localisation means are contactless localisation means, which means that in normal operation they do not make physical contact with the indication body. In this way, use of the reproduction device can be made even more comfortable and/or ergonomic. Preferably, the localisation means are arranged to use electromagnetic radiation, such as visible light and/or infrared radiation, for determining the position of the indication body. For that purpose, the localisation means can include optical sensors and/or infrared sensors. Alternatively, or additionally, the localisation means are arranged to use ultrasonic waves for determining the position of the indication body. The localisation means can also be arranged to use detection of electromagnetic induction, induced by the indication body, for determining the position of the indication body. The localisation means can also be arranged to use detection of a magnetic field, caused by the indication body, for determining the position of the indication body.

According to another particular embodiment of the reproduction device according to the invention, the reproduction device includes a display, wherein preferably an inclination of the display with respect to the image is adjustable, preferably during use of the reproduction device. As a result the user of the reproduction device can have a relatively comfortable and/or ergonomic position with respect to the reproduction device, and still clearly perceive the processed registered image portion reproduced on the display. Preferably the display in use is motionless in a direction in which the lines of text extend. This promotes a natural and ergonomic way of reading. The display preferably is a colour display or a display that shows a three-dimensional view, with which the processed registered image portion preferably can be reproduced in colour. The display can for example be a liquid crystal display (LCD), or an organic light-emitting diode (OLED) display that has the advantage of a relatively good front-of-screen performance, which can be helpful to persons with impaired vision. In a particular embodiment according to the invention the display is a rollable display. In this way a compact and light-weight embodiment of the reproduction device according to the invention can be obtained.

Preferably, the reproduction device is arranged so that the indication body, for example the finger, in use of the reproduction device is moved substantially in line with a line of text that is being reproduced. This gives a natural and ergonomic way of reading, in particular in combination with the display in use of the reproduction device being motionless in a direction in which the lines of text extend.

More preferably, the registration means are arranged to also register at least part of the indication body and to reproduce this at least partly together with the processed registered image portion. In this way the user of the reproduction device can follow the indication body on the display. This promotes a natural and ergonomic way of reading.

Preferably, the reproduction device is arranged so that it offers to the user of the reproduction device a view of the indication body and/or the image portion that is to be registered, preferably together with reproducing the processed registered image portion. This also promotes a natural and ergonomic way of reading.

In an embodiment, the registration means, preferably the camera, are rigidly positioned and/or fixed in the reproduction device. This enables a more robust design of the reproduction device.

In an embodiment, the registration means are arranged to optically register the image as a whole. This is especially useful if the registration means are rigidly positioned and/or fixed in the reproduction device.

In an embodiment, the signal processing means are arranged to select the image portion from the image in response to the determined position of the indication body. This forms an efficient way of selecting the image portion of the image. This embodiment allows the registration means, preferably the camera, to be fixed and/or rigidly positioned in the reproduction device. This is especially useful if the registration means are arranged to optically register the image as a whole.

In an embodiment, the reproduction device is provided with a housing and a screen arm having a first hinge and a second hinge, wherein the screen arm is rotatably connected with the display via the second hinge and is rotatably connected with the housing via the first hinge. As a result, the user can adjust a position of the display with respect to the housing, the registration means, and/or the image, irrespective of the inclination of the display with respect to the image. The housing may surround at least partly the registration means.

In an embodiment, the reproduction device is provided with the housing and with a roller for placing the image thereagainst and/or for moving the reproduction device over the image, wherein the roller is arranged to be unfolded from the housing. As a result of such unfolding, an optical path between the registration means and the image may be unblocked. Such an unfoldable roller enables a compact design of the reproduction device. The reproduction device may include a mirror. The unblocked optical path may include reflection in the mirror.

In an embodiment, the reproduction device is provided with a light-emitting device for illuminating the image. This enhances a quality of reproduction obtained by the reproduction device.

The invention also provides an assembly of an indication body and a reproduction device according to the invention.

The invention also provides a method for reproducing an image portion that is to be registered from an image by using a reproduction device, the method including the following steps: a) determining a position of an indication body; b) selecting a position of the image portion that is to be registered relative to the image in response to the determined position of the indication body; c) optically registering at least the image portion that is to be registered by means of registration means, including possibly registering the whole image; d) electronically processing the registered image or the registered image portion; and e) reproducing a processed registered image portion. If only the image portion is optically registered in step c. the said position of the image portion can be selected by moving the registration means. If the registration means are fixed, the whole image can be registered in step c. The selection of the position of the image portion can be made by means of the processing of the registered whole image so as to obtain the image portion in step d.

The invention will be described by, non-limiting, examples in reference to the accompanying drawings, wherein.

Figure 1:
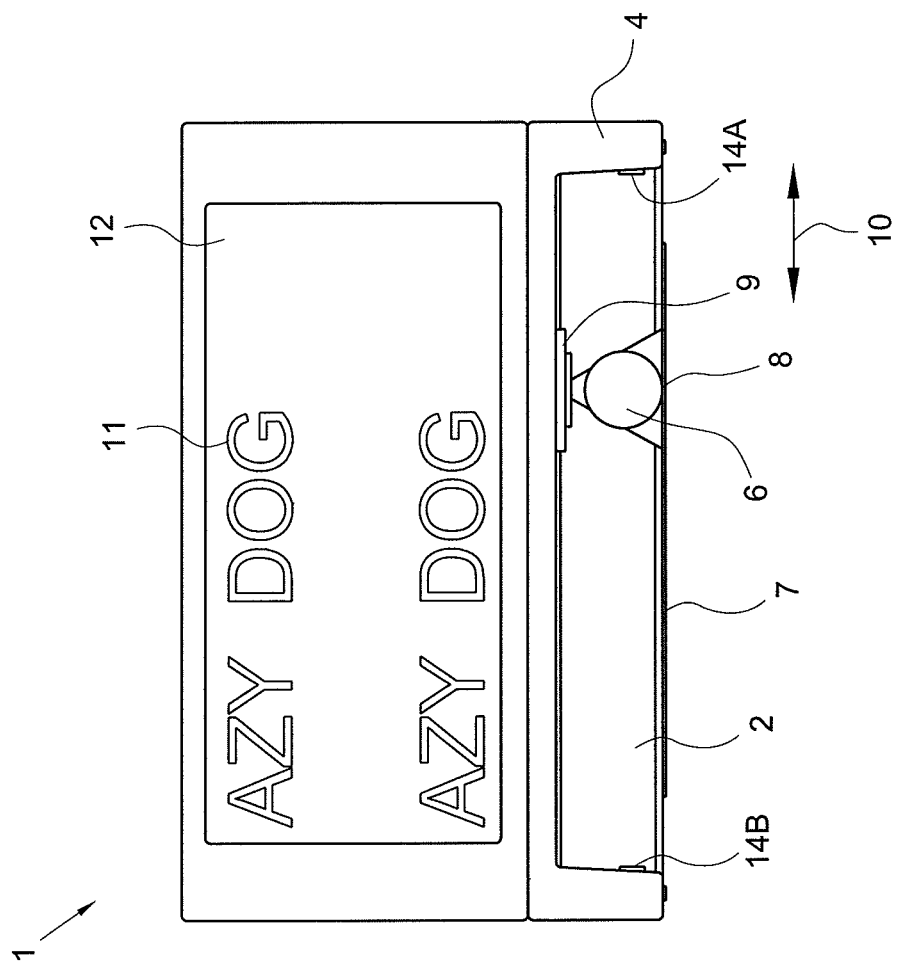
FIG. 1 shows a front view of a first possible embodiment of a reproduction device according to the invention.
Figure 4:
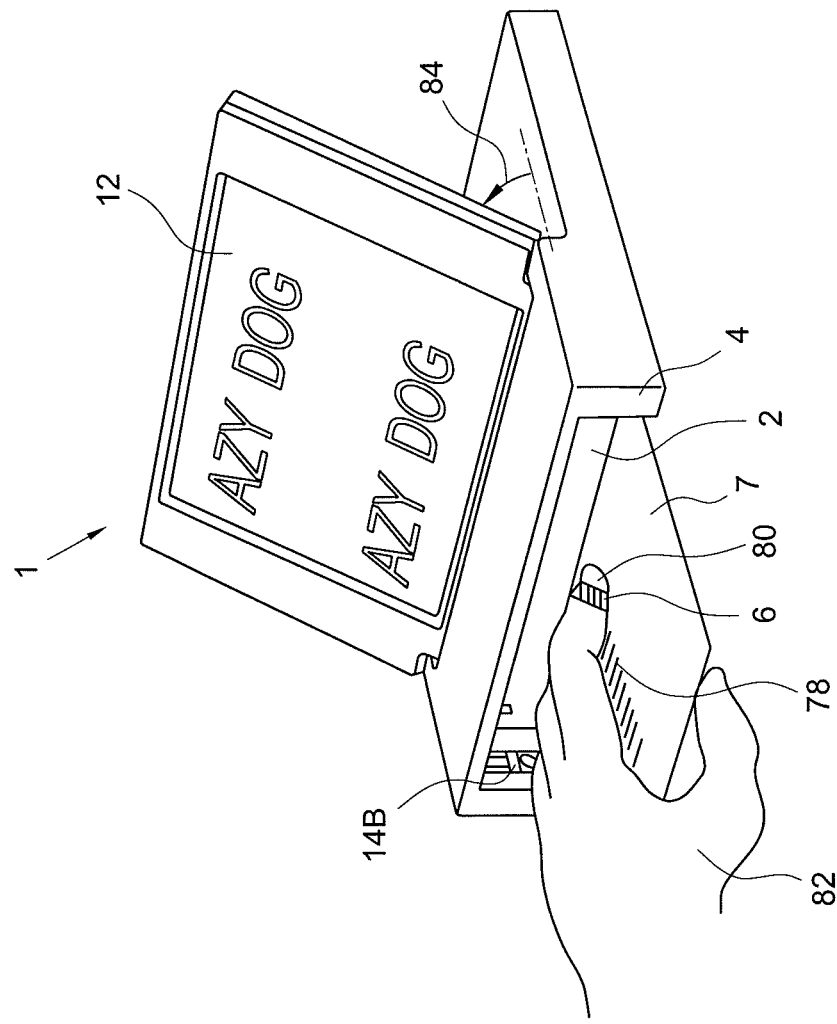

FIGS. 3A-E show front views of a part of the embodiment of the reproduction device according to FIG. 1 in different stages of an example of a method according to the invention;

FIG. 4 shows an assembly comprising the reproduction device of FIG. 1 and an indication body.

Figure 5A:
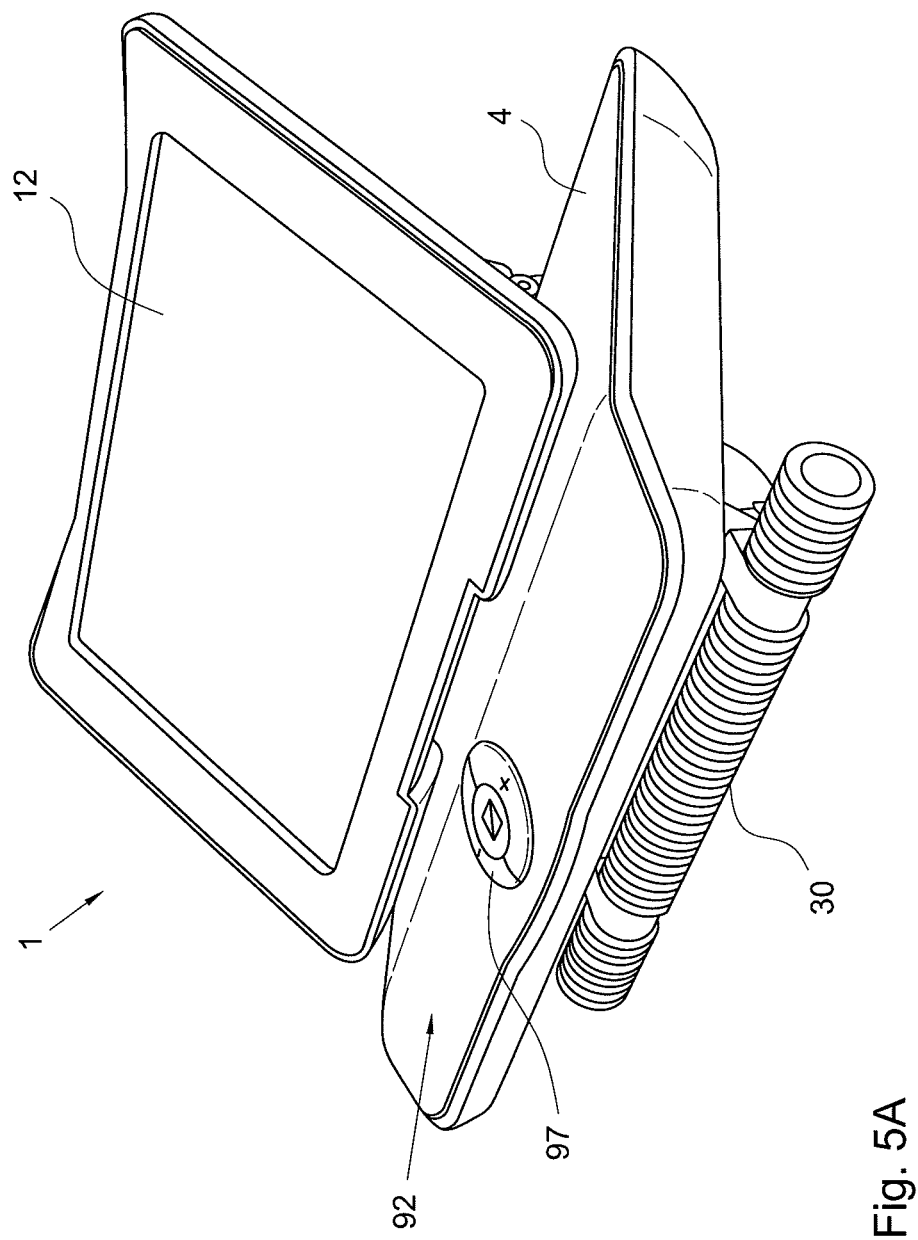
Figure 5B:
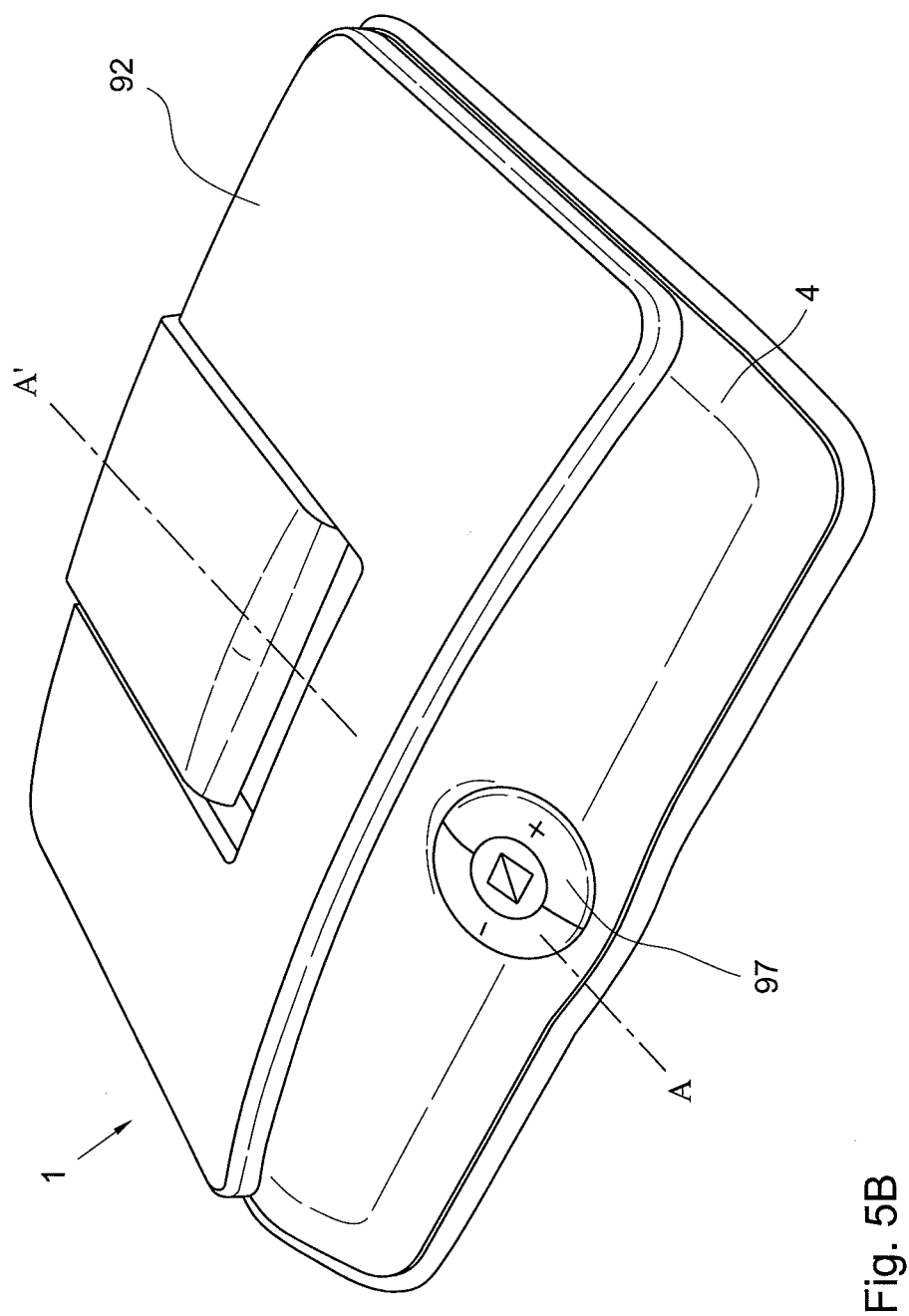
Figure 5C:
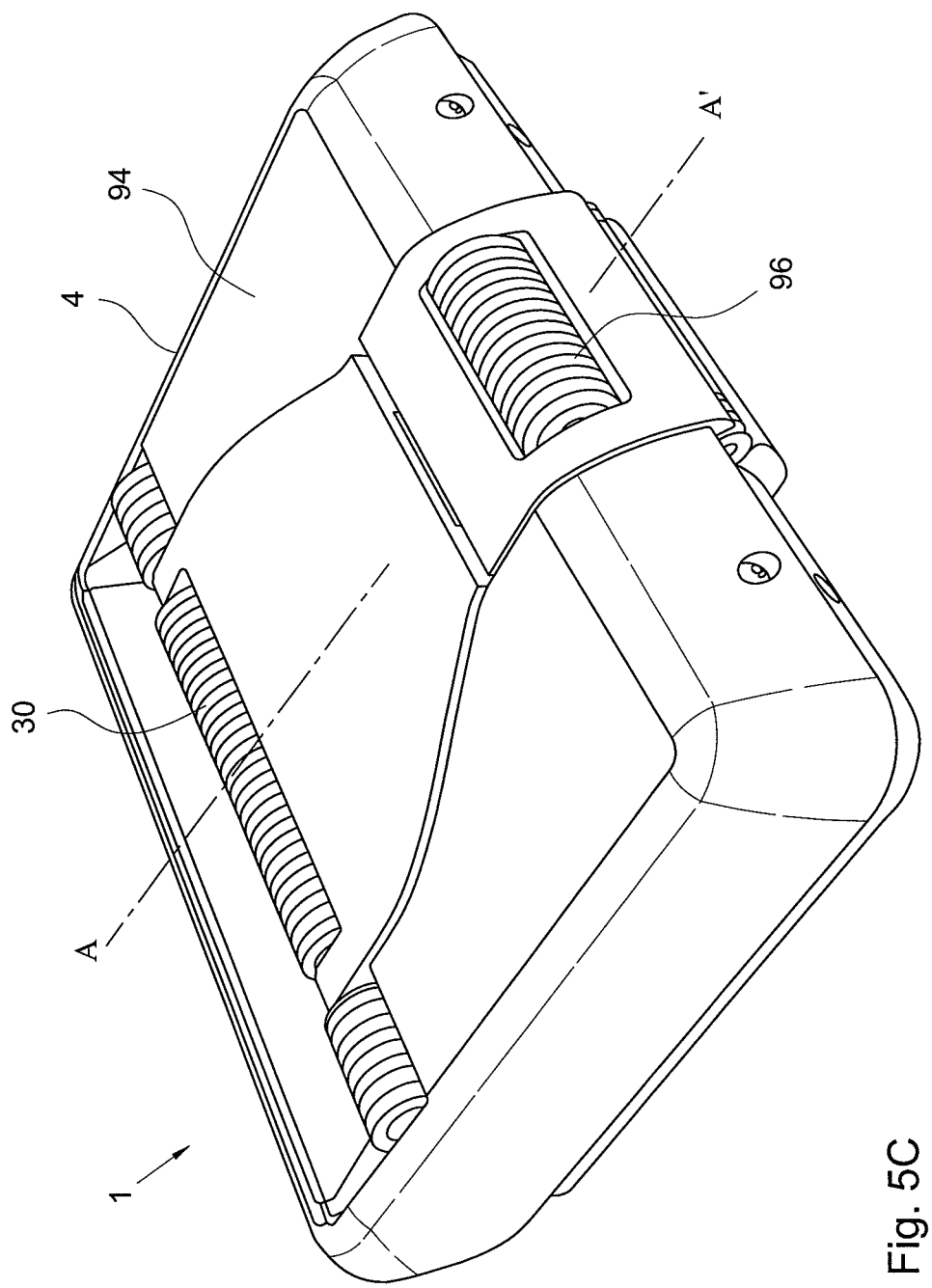
Figure 6A:
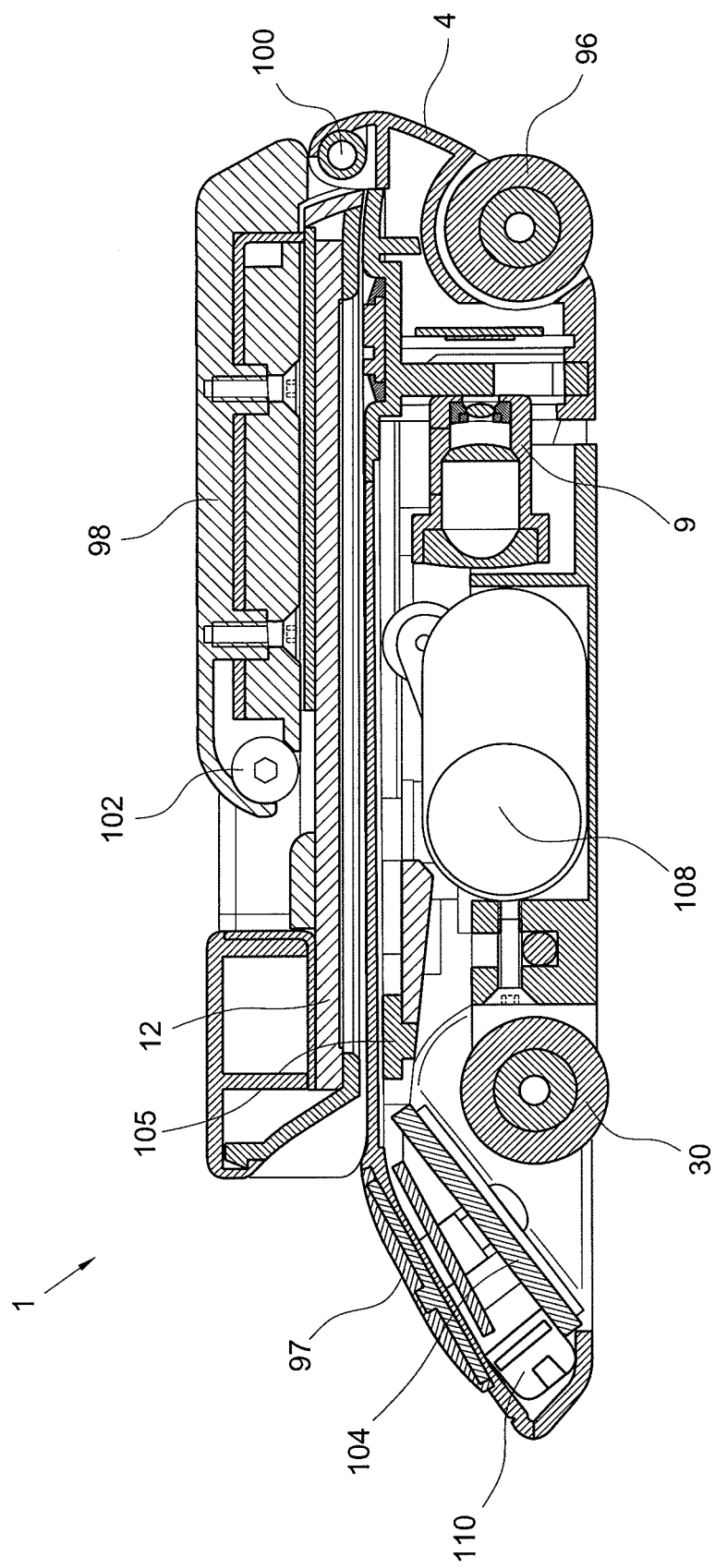
Figure 6B:
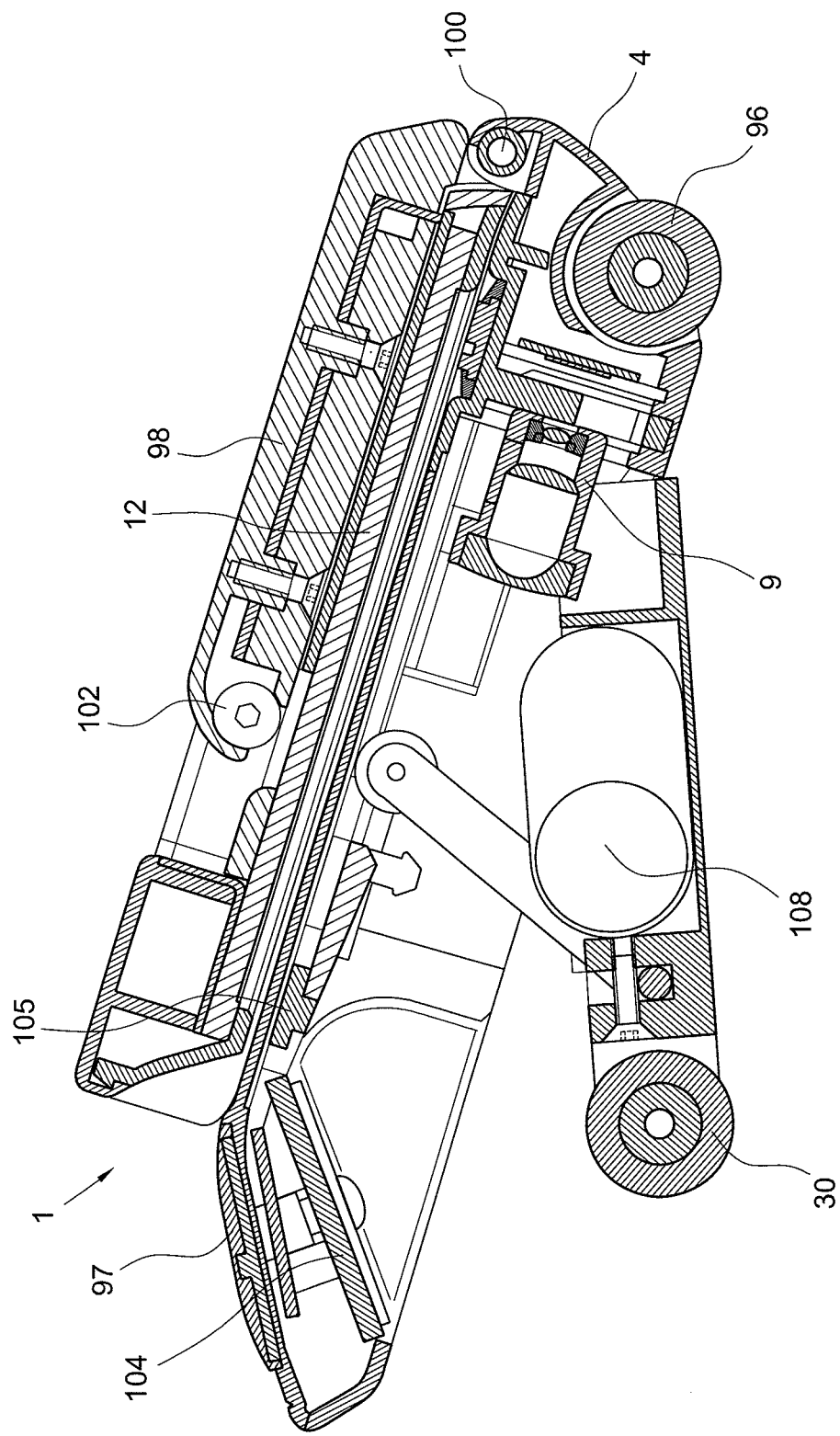
Figure 6C:
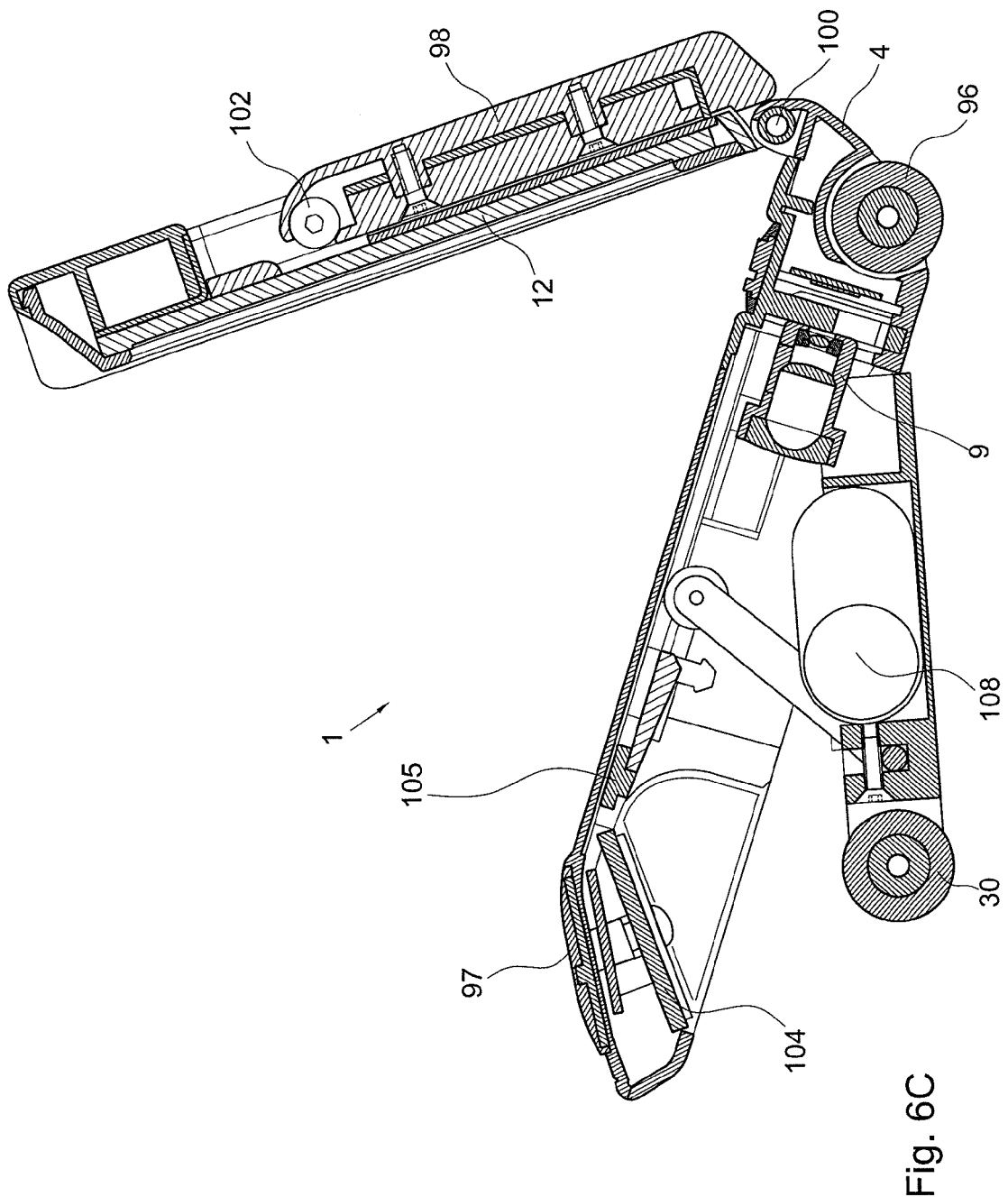
Figure 6D:
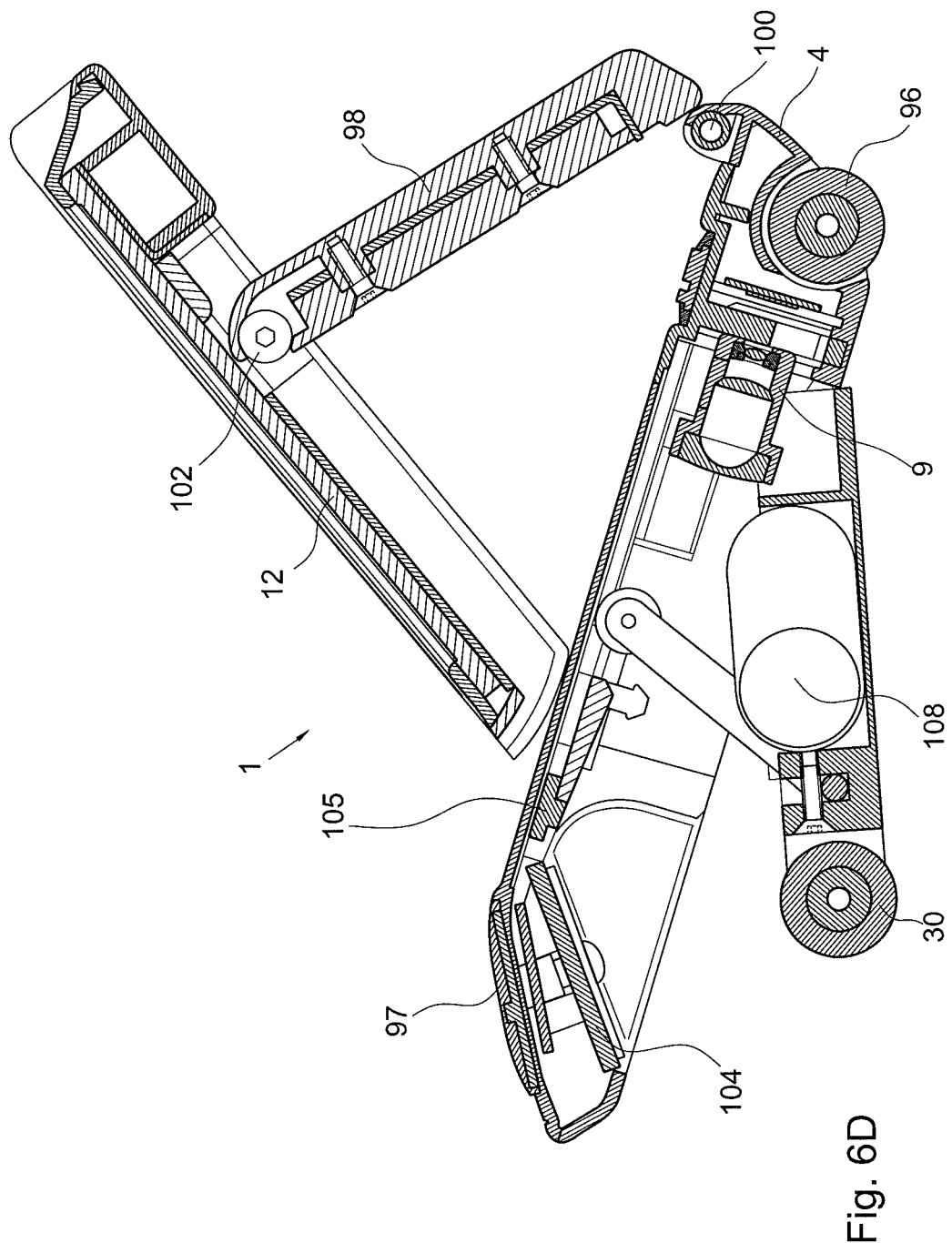
Figure 7B:
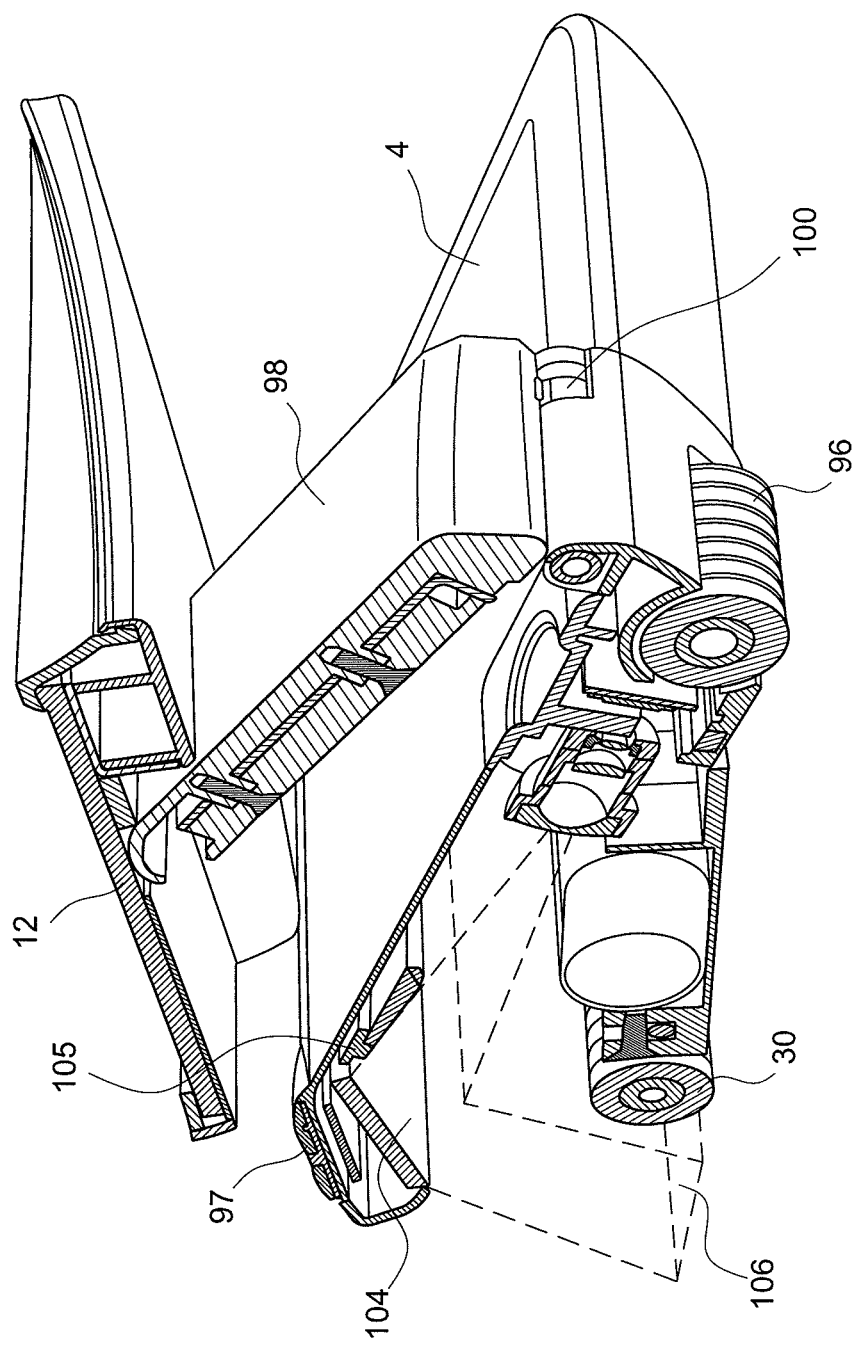

FIGS. 5A, 5B and 5C show a second embodiment of a reproduction device according to the invention;

FIGS. 6A, 6B, 6C, and 6D show the reproduction device of FIGS. 5A-5C in cross section; and FIGS. 7A and 7B show respectively a front view and a back view of the reproduction device of FIGS. 5A-C.

FIG. 1 shows a front view of a first possible embodiment of a reproduction device 1 according to the invention, provided with an entrance opening 2 in a housing 4. FIG. 1 also shows an indication body 6 and a sheet of paper 7 with an image (not shown in FIG. 1, but shown in FIG. 4 with reference number 78), a portion of which is registered by the reproduction device in use. It is clear that the term 'image' can be interpreted broadly. A surface of uniform colour, such as a uniform white surface or a uniform black surface, can even be considered an image. The image may be formed by any surface that can be registered by means of the reproduction device, for example a surface on which the reproduction device is placed. The image in this example includes readable information, more in particular lines of text. In this example the readable information is formed by characters such as letters and/or numbers. It is clear that the readable information can also have another appearance, such as braille text, bar codes, colour codes, and the like. The indication body 6, for example a finger of a user of the reproduction device, is positioned adjacent to a first image portion 8 that is to be registered. By using optical registration means, which in this example include a camera 9, the first image portion 8 that is to be registered can be registered. The camera 9 in this embodiment is moveable along a first imaginary axis, represented by a double arrow 10. A direction indicated by this arrow coincides with a direction in which the lines of text extend. Hence, the camera can move along a line of text, while the remainder of the reproduction device may remain stationary with respect to the image.

In this embodiment a position of the indication body 6 along the first imaginary axis is determined by using localisation means that include first and second localisation sensors 14A and 14B. In this embodiment, these sensors are optical sensors arranged to use electromagnetic radiation, such as infrared radiation, for determining the position of the indication body. However, these sensors may also be arranged to use for example another contactless detection principle, for example to use ultrasonic waves and/or to use detection of electromagnetic induction or detection of a magnetic field, induced by the indication body, for determining the position of the indication body. As an alternative for, or an addition to, the localisation sensor 14A and 14B in FIG. 1, localisation sensors may be positioned at other positions as well, for example along a line parallel to the first imaginary axis. The operation of the localisation means and the first and second localisation sensor 14A and 14B will be further described with reference to FIGS. 2A, 2B, and 3.

By moving the camera 9 along the first imaginary axis and also moving the reproduction device along a second imaginary axis that extends substantially perpendicular to the first imaginary axis and is directed parallel to a plane of the image on the sheet of paper 7 in FIG. 1, each part of the image on the sheet of paper 7 in a rectangular area with a first length along the first imaginary axis and a second length along the second imaginary axis can be registered. Moreover, moving the reproduction device in a direction that is substantially perpendicular to a line of text, a next line of text can be easily found. According to another embodiment the camera 9 can, in addition to being moveable along the first imaginary axis, also be moved along the second imaginary axis, without moving the reproduction device 1. The first length is for example substantially equal to a length of a sheet of paper with standard dimensions, such as for example a sheet of paper of A-series format, for example A4, A5, A5, or A7 format, B-series format, or C-series format, or a sheet of paper according to similar British or American standard dimensions, such as for example formats described in ANSI X3.151-1987. In particular, the first length is substantially equal to a length of a sheet of paper of the American "letter" format, for example the width of this format of 8.5 inch (215.9 mm). In this way the reproduction device is suitable for a sheet of paper or other documents and/or books that have standard dimensions.

The reproduction device 1 is arranged to optically register the first image portion 8 that is to be registered, is provided with electronic signal processing means arranged to process the thus registered image portion, and is provided with the display 12 to visually reproduce the thus processed registered image portion as a reproduced image portion. A first reproduced image portion 11, in this case two lines of text with the text fragment "AZY DOG", corresponds with the first image portion 8 that is to be registered. It is clear that in this example, processing by the electronic processing means may include merely transmitting the registered first image portion 8 to the reproduction means, in this embodiment including the display 12. Alternatively the first reproduced image portion 11 can include another number of lines of text, such as three lines of text. The first reproduced image portion 11 is reproduced magnified with respect to the first image portion 8 that is to be registered. Alternatively, or additionally, the first reproduced image portion 11 may have a changed polarity, such as a negative image, with respect to the first image portion 8. For example, the first image portion 8 may include dark text against a light background, while the first reproduced image portion 11 may include light text against a dark background (not shown in FIG. 1). The colours of the light text, dark text, light background, and dark background may be adjusted, for example by using false colours, to improve legibility. The first reproduced image portion 11 can for example have a better legibility and/or readability, for example for dyslectic persons, compared to the first image portion 8. This can for example be achieved by choosing an optimal font type for the reproduced image portion 11, or by choosing an optimal amount of words for the reproduced image portion 11.

For example, the reproduction device 1 may be arranged to improve, by reproduction, legibility of the image portion 8 that is to be reproduced for dyslectic people, preferably in combination with acoustic and/or phonetic reproduction of text of the image portion 8 that is to be reproduced. The reproduction device may for example also be arranged to highlight a part of the reproduced image portion 11 that corresponds with a part of the image portion 8 that is to be reproduced that is positioned adjacent to the indication body 6. In this way the reproduction device 1 can be used as an improved remedial teaching device for dyslectic people.

In particular the reproduction device 1 is also arranged to reproduce at least part of the indication body 6 on the display 12 (not reproduced on the display 12 in FIG. 1). Reproducing the indication body 6 in this way can facilitate reading for the user.

Figure 2A:
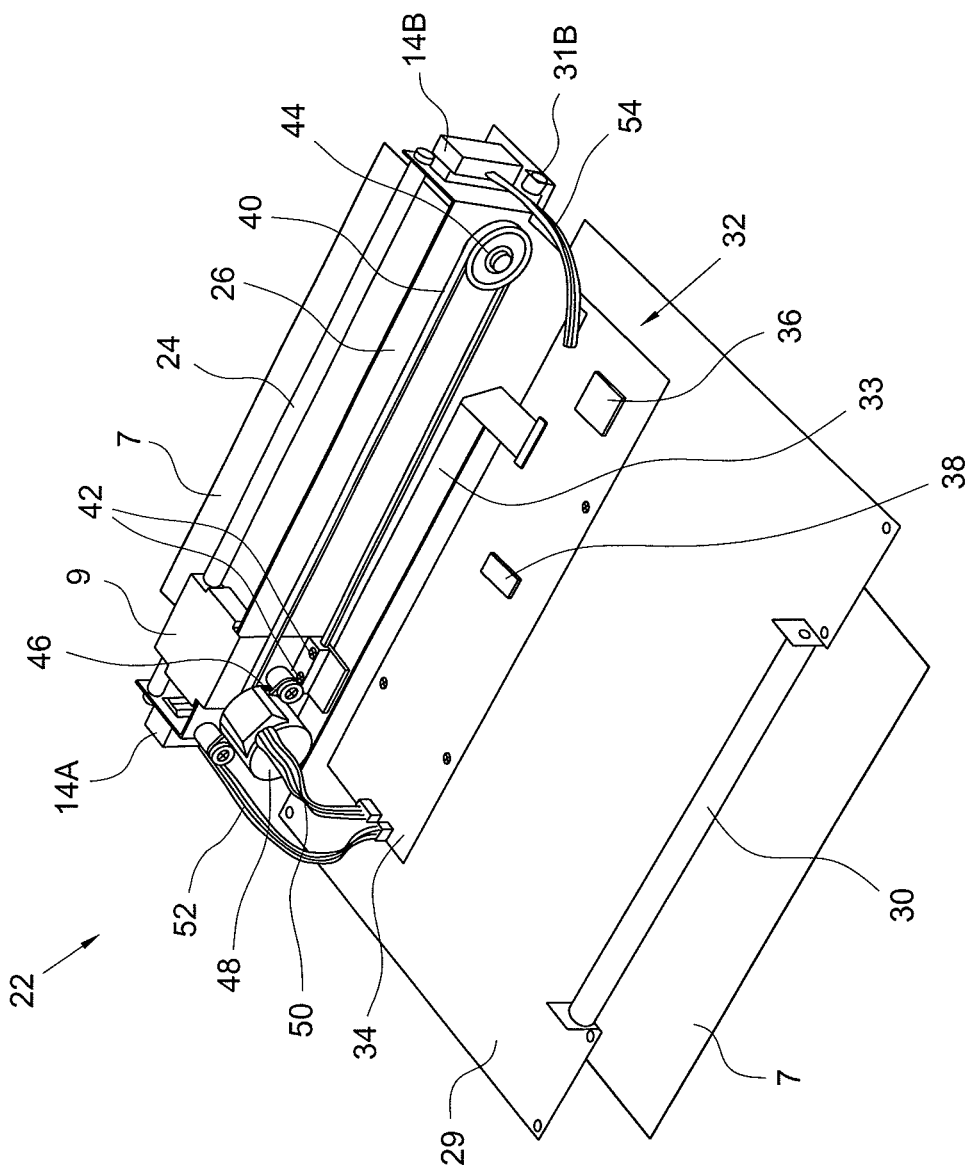
FIGS. 2A and 2B show elevated perspective views of a part of the embodiment of the reproduction device according to FIG. 1.
Figure 2B:
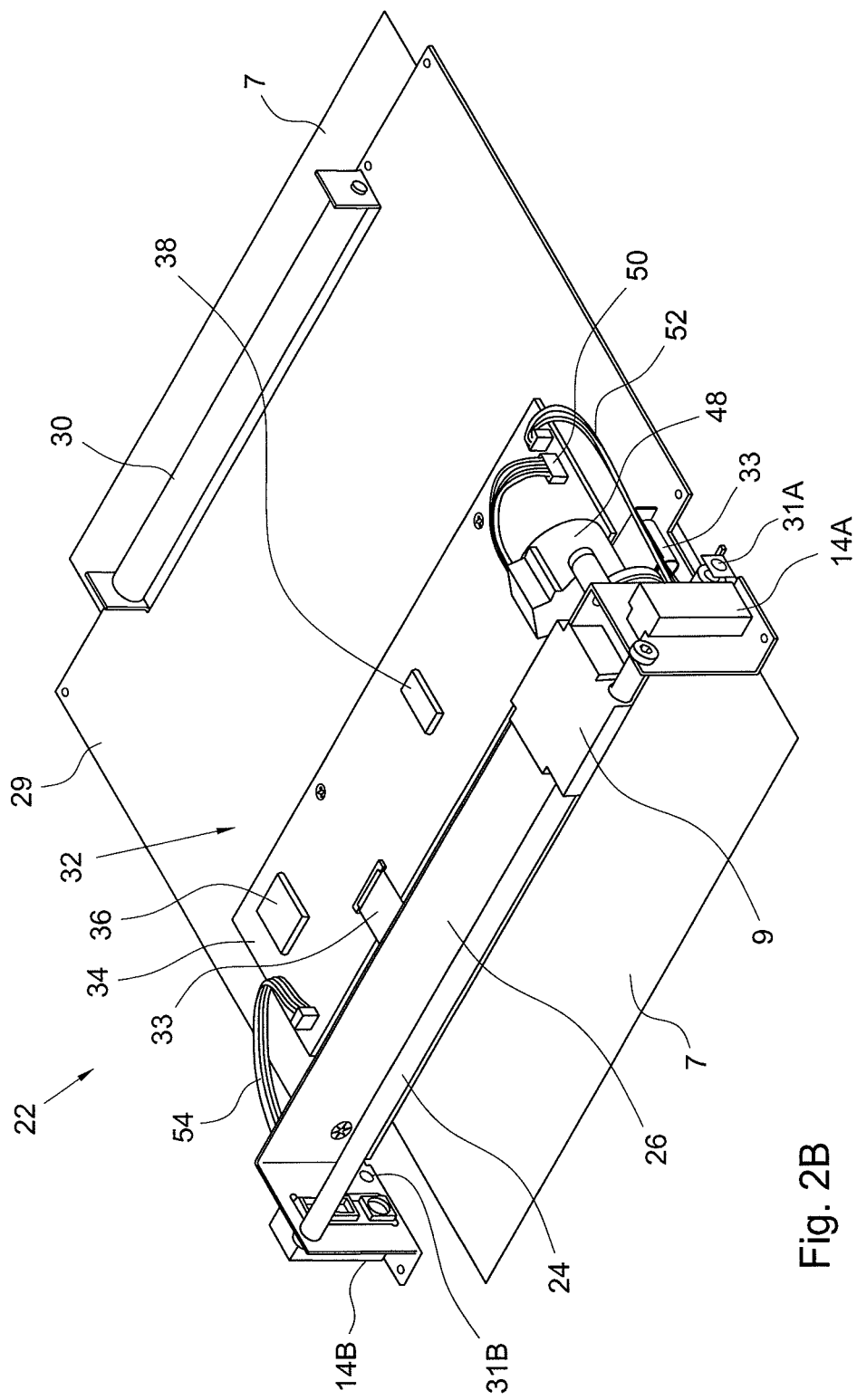

FIGS. 2A and 2B show elevated perspective views of a part 22 of the embodiment of FIG. 1. FIG. 2A shows an elevated perspective view substantially from the back of the part 22, while FIG. 2B shows an elevated perspective view substantially from the front of the part 22. The camera is moveably mounted on a guiding element 24, that in this example has the shape of a cylindrical bar, and on a part 26 of a chassis 29. The part 22 is in this example provided with a roller 30 and two additional roller means 31A and 31B that are rotatably attached to the chassis 29, so that the reproduction device 1 can be moved relatively easily over the sheet of paper 7 along the second imaginary axis. The roller 30 and the additional roller means 31A and 31B in use form support elements for placing the image thereagainst. In this way the reproduction device 1 can be moved along the second imaginary axis when the indication body is moved from a first line of text to a second line of text. It is clear that the reproduction device 1 does not have to be moved along a line if the indication body 6 is moved along a line parallel to the first imaginary axis.

The part 22 is further provided with electronic means 32. The camera 9 is connected to the electronic means 32 via a cable 33. The cable 33 can for example be a flexfoil cable. The electronic means 32 in this example include a printed circuit board (PCB) 34 provided with conducting tracks (not shown but known to the person skilled in the art), and at least a processor 36 and a, preferably non-volatile, memory 38. The electronic means 32 comprise signal processing means. By using these signal processing means, the registered image portion that is registered by using the camera 9 is processed.

After processing of the registered image portion by using the processor 36, the processed registered image portion is reproduced by using the reproduction means, which in this embodiment include the display 12. Alternatively, or additionally, the reproduction means can include a speaker, which in use for example acoustically reproduces the lines of text that are included by the first image portion 8 that is to be registered. It may be clear that the reproduction means may be arranged for generating a stimulus for the ears, eyes, and/or fingers of the user. In this case the signal processing means are preferably provided with the ability of pattern recognition, for example optical character recognition (OCR). Then, the signal processing includes recognition of words that are included by the first image portion 8 that is to be registered. Possibly it also includes translation of these words into another language or dialect. If an image portion that is to be reproduced includes a picture, the signal processing can for example also include isolation of the picture and/or couloring of the picture. The position of the indication body 6 can also be determined by using the camera 9. In particular, the position of the indication body 6 along the second imaginary axis is determined by using the camera 9.

The camera 9 can be moved over the guiding member 24 and the part 26 of the chassis 29 with relatively low friction. The camera 9 can be attached to a belt 40 using attachment means, in this case including the screws 42. In use the belt 40 runs over a first wheel 44 and a second wheel 46, wherein the first wheel 44 is attached freely rotatable to the chassis 29 and the second wheel 46 is rotated by a motor 48, for example an electromotor or a stepper motor, and preferably a motor that can be powered by a DC voltage. The motor 48 is rigidly attached to the chassis 29. When the motor rotates the second wheel 46, the belt 40 will move as a result of friction between the belt 40 and the second wheel 46, and as a result will move the camera 9 along the guiding element 24 and the part 26 of the chassis 29. The first and second localisation sensor 14A and 14B are arranged to localise the indication body 6 and to determine the position of the indication body along the first imaginary axis that is directed substantially parallel to the direction of movement of the camera 9 along the guiding element 24. The indication body 6 is not shown in FIGS. 2A and 2B, but examples are shown in FIGS. 1, 3, and 4 with reference number 6 and are further described in the description of these figures. It is clear to the person skilled in the art how the first and second localisation sensor 14A and 14B can be constructed. The motor 48 is electrically connected with the electronic means 32 via a cable 50. The first and second location sensor 14A and 14B are connected respectively via the cables 52 and 54 with the electronic means 32. The camera 9 is connected via the flexible cable 33 with the electronic means 32. The cables 33, 50, 52, and 54 can for example be flexfoil cables.

By using the electronic means 32 an image portion registered by the camera 9 is stored in the memory 38 of the electronic means 32. After processing of the registered image portion by using the processor 36, the processed image portion is reproduced by using the reproduction means, for example the display 12 or the speaker. The processing can for example include increasing the resolution of the registered image portion. Preferably the electronic means 32 are arranged to also determine a position of the camera 9. This can for example be performed by initially moving the camera 9 to a known starting position, and from then on determine the position of the camera 9 based on the controlling signals that are sent from the electronic means to the motor 48 to let the motor move the camera 9.

The electronic means 32 in this embodiment are also arranged to form an automatic control, wherein the position of the camera 9 along the guiding member 24 is regularly or continuously compared with the position of the indication body 6 that is localised by using the first and second localisation sensor 14A and 14B. This automatic control comprises for example reading a signal for the localisation means by using the processor 36, which signal yields the position of the indication body after using predetermined calibration factors. The automatic control also comprises for example comparing the position of the indication body 6 with the determined position of the camera 9 by using the processor 36. The automatic control also comprises for example steering the motor 48 in order to bring a difference between the position of the indication body 6 and the position of the camera 9 below a predetermined threshold value. Preferably the localisation means are also arranged to determine a direction of movement of the indication body 6 and preferably also to determine a velocity of the indication body 6. By using the direction of movement and the velocity of the indication body 6 the automatic control can for example be made more effective. For example, if the direction of movement and the velocity of the indication body 6 are determined, the motor 48 can move the camera 9 directly with an optimal velocity in the direction of the indication body 6. By using the automatic control, the position of the image portion that is to be registered can be related to the position of the indication body 6.

Figure 3A:
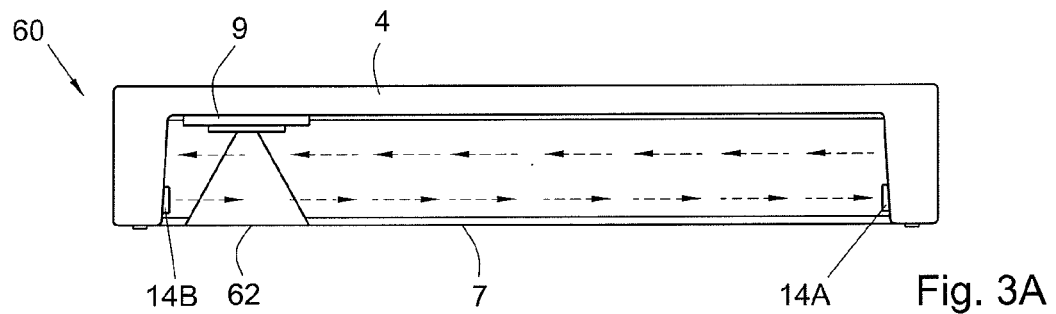
Figure 3B:
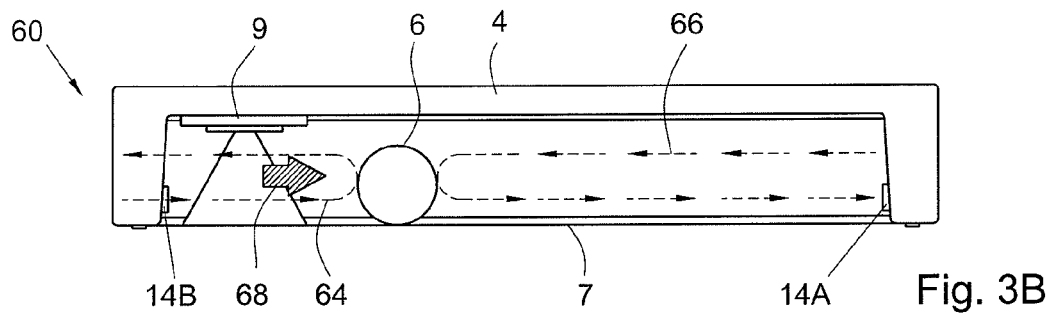

Alternatively, or additionally, the localisation means are arranged to use the camera 9 for contactless determination of the position of the indication body 6. In particular the position of the indication body 6 along the second imaginary axis, which extends substantially perpendicular to the first imaginary axis that is, in this example, directed substantially parallel to a line connecting the first and second localisation sensor 14A and 14B, is determined by using the camera 9. A method according to which the part 22 of FIGS. 2A and 2B can function, will be described with the help of FIGS. 3A-E. FIGS. 3A-E show front views of a part 60 of the embodiment of the reproduction device 1 according to FIG. 1 in different stages of an example of a method according to the invention. The part 22 of FIG. 2 in use preferably functions according to this example of the method according to the invention. FIGS. 3A-E also show the camera 9 and the first and second localisation sensor 14A and 14B, that are operated without making contact with the indication body 6. FIGS. 3A-E also show the indication body 6, the housing 4 that substantially surrounds the part 22 of FIGS. 2A and 2B, and the sheet of paper 7 provided with the image (not shown in FIG. 3 but shown in FIG. 4 with reference number 78). FIG. 3A shows a start situation in which the camera 9 registers a second image portion 62 that is to be registered, and in which the localisation sensor 14A and 14B do not detect an indication body. FIG. 3B shows a situation in which the indication body 6 is positioned on the sheet of paper 7 and is detected by the first and second localisation sensor 14A and 14B. An infrared bundle 64 that is generated by the second localisation sensor 14B is reflected by the indication body 6 and the reflected bundle 64 is detected in the second localisation sensor 14B. Analogously an infrared bundle 66 generated by the first localisation sensor 14A is reflected by the indication body 6 and is subsequently detected in the first localisation sensor 14A. From the time difference between a moment of sending and a moment of receiving of the infrared bundles 64 and 66 and their reflections, the position of the indication body 6 is determined. The first and second localisation sensor 14A and 14B preferably also measure a change in frequency of the bundles 64 and 66 as a result of reflection of the bundle on the indication body 6. From this change in frequency a direction of movement and/or velocity of the indication body 6 can be derived, using the theory that describes the Doppler effect. It is clear to the person skilled in the art how such a determination of direction of movement and/or velocity can be carried out. According to this example, after determining the position of the indication body 6, the position of the camera 9 is compared with the position of the indication body 6. If the difference between both positions is for example larger than the predetermined threshold value, the camera 9 is moved in the direction of the indication body 6 along arrow 68, until at a following determination of the position of indication body and camera the difference between these positions is smaller than the predetermined threshold value. Hence it holds that the reproduction device is arranged to select a position of the image portion that is to be registered relative to the image in response to the determined position of the indication body.

Figure 3C:
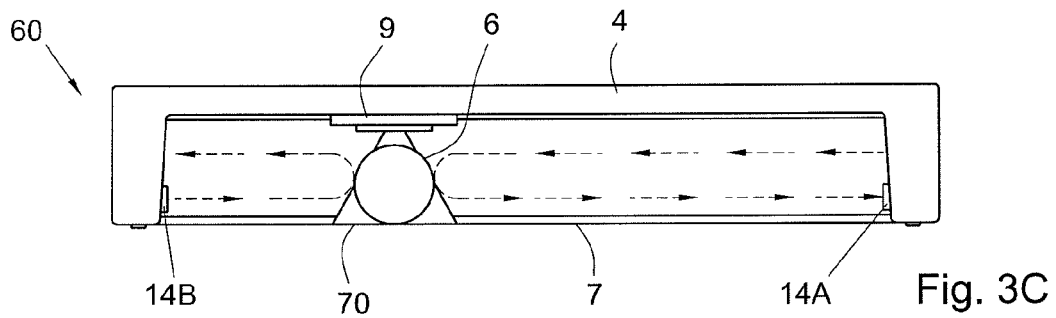
Figure 3D:
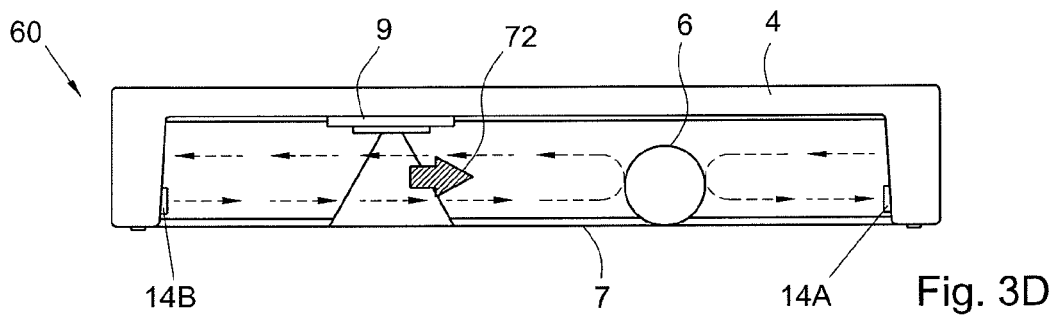
Figure 3E:
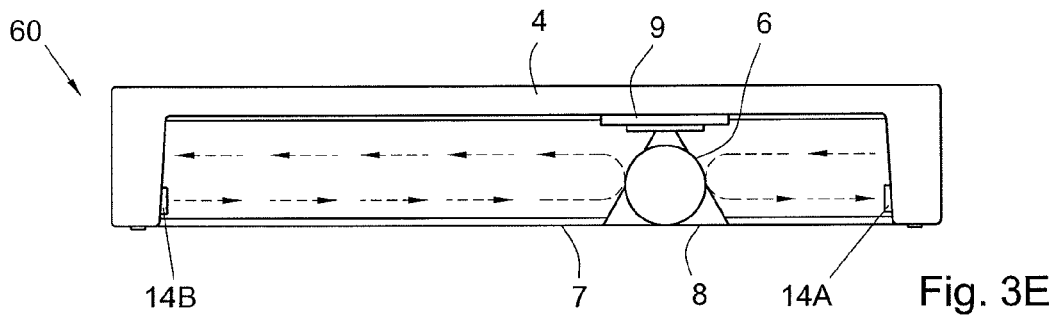

FIG. 3C shows the situation in which the camera 9 has reached a position adjacent to the indication body 6. The camera now registers a third image portion 70 that is to be registered, and which has a position adjacent to the indication body in FIG. 3C. Subsequently the indication body is moved by the user to a new position on the sheet of paper 7, after which the situation of FIG. 3D occurs. The indication body 6 in this new position is detected by the first and second localisation sensor 14A and 14B, and subsequently the camera 9 is moved in the direction of arrow 72 towards the indication body 6, in case the difference in position is larger than the predetermined threshold value, which is the case in FIG. 3D. Because of this the situation of FIG. 3E is reached, wherein the camera registers the first image portion 8 that is to be registered. The first, second, and third image portion 8, 62, and 70 that is to be registered are shown on the display 12 (not shown in FIGS. 3A-E but shown in FIGS. 1 and 4 for the first image portion 8, shortly after registration.

FIG. 4 shows an assembly comprising the reproduction device 1 of FIGS. 1-3, the indication body 6, and the sheet of paper 7 with the image 78. The reproduction device 1 according to the invention with the housing 4 is shown in FIG. 4 together with the indication body 6, that is rigidly connected with the finger 80 by being clamped around it. Alternatively a pencil or a pointing stick can be used, that in use are held by the user. FIG. 4 shows the second contactless localisation sensor 14B and a hand 82 of the user with the finger 80.

In a specific embodiment the indication body 6 is substantially transparant for visible light, so that it is not perceived by the camera (not shown in FIG. 4, but shown in FIGS. 1-3 with reference number 9) while it is detected by the localisation sensors 14A and 14B. Preferably, the transparent indication body 6 is positioned between the camera 9 and an object plane of a lens of the camera 9. Because the indication body 6 is transparent, it will not be perceived by the camera 9 and thus does not hinder the reproduction of the image portion that is to be reproduced and is adjacent to the indication body 6.

In another specific embodiment the indication body 6 is partly transparent and partly non-transparant for visible light, so that the camera 9 does register the indication body 6 while a disturbance by the indication body 6 of the lines of text that are to be registered adjacent to the indication body 6 is minimal. The indication body 6 may include a magnetic material, such as a permanently magnetic material or a paramagnetic material, so as to improve its detectability.

The indication body 6 is positioned adjacent to the sheet of paper 7, that can be reached by the entrance opening 2 by the user. On the display 12 the first reproduced image portion 11 is visible, corresponding with the first image portion 8 that is to be registered that has a position close to the finger 80, in this example two lines of text with the text fragment "AZY DOG". Preferably the display is arranged so that before and/or during use of the reproduction device an inclination of the display with respect to the image, indicated by angle 84, is adjustable. With help of the opening 2, the reproduction device 1 can for example be arranged so that it offers to the user of the reproduction device a view of the indication body 6 and the first image portion 8 that is to be registered, preferably together with reproducing the first reproduced image portion 11 on the display 12. This promotes a natural and ergonomic way of reading.

According to yet another embodiment of the reproduction device 1, the camera is rigidly positioned in the reproduction device 1. In this case, the registration means are arranged to optically perceive the image, for example all lines of text, as a whole. In this case the position of the image portion that is to be reproduced can also be related to the position of the indication body. The image portion that is to be reproduced in this case forms the image portion that is to be registered as part of the image perceived as a whole. The signal processing means may in that case be arranged to select the position of the image portion relative to the image (thus selecting the image portion from the whole registered image) in response to the determined position of the indication body. Such kind of embodiments will be discussed on the basis of FIGS. 5A, 5B, and 5C.

Optionally the reproduction device 1 in FIGS. 1 and 3 is arranged in such a way that the camera 9 can be controlled by a mouse, a joystick, or a touch screen.

FIGS. 5A, 5B and 5C show the reproduction device 1 in a second embodiment according to the invention. The reproduction device 1 is provided with the display 30, the housing 4, and the roller 30. FIG. 5A shows the reproduction device in an opened state, after unfolding the screen 12 and the roller 30. FIGS. 5B and 5C show the reproduction device 1 in a closed state. FIGS. 5A and 5B shows a first side 92 of the reproduction device 1, while FIG. 5C shows a second side 94 of the reproduction device 1 that is opposite to the first side 92. FIG. 5C shows the roller 30 and an additional roller 96 that functions similar to the two additional roller means 31A and 31B of FIGS. 2A and 2B.

The roller 30 and the additional roller 96 in use may form support elements for placing the image thereagainst. In this way the reproduction device 1 can be moved along the second imaginary axis when the indication body is moved from a first line of text to a second line of text.

The reproduction device 1 may have controls 97. The controls 97 may be electrically connected to the electronic signal processing means. This may enable adjusting of processing the registered image portion by means of the controls 97. Such adjusting may be carried out by the user of the reproduction device 1, for example by pressing a button of the controls 97. Here, adjusting may include adjusting a magnification of the reproduced image portion with respect to the image portion that is to be registered. The adjusted magnification may be in a range from three times to twentyeight times. Additionally or alternatively, adjusting may include changing one or more colours of the registered image portion. Such colours may for example include a colour of text of the image portion, or a background colour of the text. Alternatively or alternatively, adjusting may include selecting the position of the image portion that is to be registered independent from the position of the indication body, optionally without determining the position of the indication body. In this way the reproduction device 1 may be arranged for scrolling through the image, for example in any direction, such as scrolling along a line of text of the image and/or in a direction transverse to the line of text of the image. Alternatively or additionally, adjusting may include changing a brightness and/or contrast of the registered image portion. Alternatively or additionally, adjusting may include changing a language of the text of the registered image portion.

The controls 97 may be positioned adjacent to the localisation means (not drawn in FIGS. 5A-C but shown in FIG. 6A with reference number 110), for example at the first side 92, preferably at a position that in use is located between the user and the display 12. This has the advantage that a user has to move his or her hand or finger only over a small distance to switch between indicating the image portion that is to be registered and using the controls 97.

FIGS. 6A, 6B, 6C, and 6D show the reproduction device 1 in the second embodiment in cross section A-A' transverse to the first and second side 92 and 94, as indicated in FIGS. 5B and 5C. FIG. 6A shows the reproduction device 1 in the closed state, while FIG. 6D shows the reproduction device 1 in the opened state.

FIGS. 6A-D show the roller 30, the additional roller 96, and the display 12. The roller 30 may be arranged to be unfolded by a user, as shown in FIG. 6B. The reproduction device 1 may have a screen arm 98. The screen arm 98 may be rotatable around a first hinge 100, as illustrated in FIG. 6C. The display 12 may be rotatable with respect to the screen arm 98 around a second hinge 102, as illustrated in FIG. 6D. By rotating the screen arm around the first hinge 100 and/or rotating the display around the second hinge 102, an inclination of the display 12 with respect to the image is adjustable. The reproduction device 1 may have a mirror 104 and/or a light-emitting device, for example a LED (Light-Emitting Diode) bar 105. The functioning of the mirror and the LED bar is explained with reference to FIGS. 7A and 7B. The LED bar may extend along a direction transverse to the plane of the cross-section A-A', for example along the double arrow 10 of FIG. 1.

FIG. 6A shows the localisation means 110, in the second embodiment including an infrared sensor. The infrared sensor may extend transverse to the plane of the cross section A-A', for example along the double arrow 10 of FIG. 1. The infrared sensor may be arranged for determining the position of the indication body when the indication body is positioned between the infrared sensor and the image.

FIGS. 7A and 7B show respectively a front view and a back view of the reproduction device 1 in the second embodiment. In the second embodiment, the camera 9, which may include a lens, is rigidly positioned in the reproduction device 1. This enables a more robust construction of the reproduction device 1 and/or enhances stability of the camera. A stable camera may improve a quality of the registered image portion. In use, the camera 9 may register the image portion in an area 106.

The rigidly positioned camera in the second embodiment may be arranged to optically perceive, for example register, the image. This image is transmitted to the signal processing means for further processing. It may be clear that the image does not necessarily include, for example, all information on the sheet of paper. Instead, the image, also referred to as the image as a whole, may refer to the image portion plus a certain amount of extra information adjacent to the image. A width of the image, in a direction transverse to the direction in which the reproduction device can be moved over the image by means of the roller 30, may approach a width of the reproduction device in that same direction. For example, the width of the image is at least 70% of the width of the reproduction device. The signal processing means, for example a computer integrated in the reproduction device, may be arranged to select the image portion from the image in response to the determined position of the indication body. The signal processing means in use may select from the image the image portion that is to be reproduced, and disregard the extra information of the image during processing. The signal processing means transmit the image portion to the display for displaying the image portion.

In use, light coming from, for example being reflected from, the area 106 may reach the camera 9 via reflection in the mirror 104. This may be enabled by unfolding the roller 30, as is described with reference to FIG. 6B. The LED bar 105 may be used for illumination of the area 106, so that light may be reflected from the area 106 towards the camera 9. By tuning illumination and/or positions of different LEDs of the LED bar, a substantially uniform intensity of the illumination can be established over the area 106. This facilitates processing of the registered image portion. For example, during processing a single threshold in intensity may be used to distinguish between text and background of the registered image portion.

The reproduction device 1 in the second embodiment may further have a battery 108, for example for driving the display 12 and the camera 9. It is also possible that in the second embodiment the localisation means is formed by the camera and the signal processing means. Hence in that case the signal processing means determine the position of the indication body within the image recorded by the camera.

It is thus believed that the operation and construction of the present invention will be apparent from the foregoing description. The invention is not limited to any embodiment herein described. It is for example possible that the reproduction means, for example the display, is not an integral part of the reproduction device. The reproduction device can for example be connectable with external reproduction means, such as a television, a mobile phone, a computer, such as a lap top computer or a PDA, for example via a known wired or wireless communication connection.

It is clear to the skilled person that thus is disclosed an inventive use of the reproduction means, the registration means, the localisation means, and the indication body, as well as an inventive combination of the reproduction means, the registration means, and the localisation means. More in general, it is clear that the invention also provides a reproduction system, having optical registration means for making a registration and having reproduction means that are electrically connected to the optical registration means, the reproduction means being arranged for reproducing at least part of the registration, wherein the reproduction system further has localisation means for determining a position of a moveable indication body, wherein, in use, the at least part of the registration is made at a position that depends on the determined position of the moveable indication body.

The registration may be formed by the registered image portion. The reproduction means may be electrically connected to the optical registration means via the electronic signal processing means. Optionally, the reproduction system is an integrated system and forms a reproduction device, preferably a portable reproduction device.

Within the purview of the skilled person, modifications are possible which should be considered within the scope of the appended claims. Equally all kinematic inversions are considered inherently disclosed and to be within the scope of the present invention.

The invention claimed is:

1. An electronic magnifier of text comprising:
   a registration means arranged to optically register a desired portion of the text on paper;
   an electronic signal processing means arranged to process at least the registered text portion of the desired portion of the text; and
   a reproduction device arranged to reproduce and magnify the processed registered text portion;
   wherein the reproduction device is provided with:
   contactless localization means arranged to determine a position of an indication body that is moveable with respect to the text and with respect to at least a part of the reproduction device, and
   in that the reproduction device is arranged to select a position of the text portion that is to be registered relative to the text in response to the determined position of the indication body, and provide a magnified desired portion of the text.

2. The electronic magnifier of text according to claim 1, wherein the localization means are arranged to use the registration means for determining the position of the indication body.

3. The electronic magnifier of text according to claim 1, wherein the localization means are arranged to use electromagnetic radiation, for determining the position of the indication body.

4. The electronic magnifier of text according to anyone of claims 1-3, wherein the localization means are arranged to use ultrasonic waves for determining the position of the indication body.

5. The electronic magnifier of text according to claim 3, wherein the electromagnetic radiation is infrared radiation.

6. The electronic magnifier of text according to claim 1, wherein the localization means are arranged to use detection of electromagnetic induction, induced by the indication body, for determining the position of the indication body.

7. The electronic magnifier of text according to claim 1, provided with electronic means arranged to relate the position of the text portion that is to be registered with the position of the indication body by using an automatic control.

8. The electronic magnifier of text according to claim 1, wherein the reproduction device is arranged to reproduce the processed registered text portion with a changed polarity with respect to the image portion that is to be registered.

9. The electronic magnifier of text according to claim 1, wherein the text portion that is to be registered includes readable text.

10. The electronic magnifier of text according to claim 9, wherein the reproduction device is arranged to reproduce the text acoustically.

11. The electronic magnifier of text according to claim 9, wherein the reproduction device is arranged to reproduce the text in a way so that the text has a better legibility for dyslectic persons.

12. The electronic magnifier of text according to claim 9, wherein the reproduction device is arranged to reproduce the text in braille.

13. The electronic magnifier of text according to claim 9, wherein the reproduction device is arranged to reproduce the text in a translated way.

14. The electronic magnifier of text according to claim 1, wherein the reproduction means are arranged to reproduce the text portion that is to be registered in colour.

15. The electronic magnifier of text according to claim 1, wherein the reproduction means include a display.

16. The electronic magnifier of text according to claim 15, wherein an inclination of the display with respect to the text is adjustable.

17. The electronic magnifier of text according to claim 1, wherein the reproduction means include a projector.

18. The electronic magnifier of text according to claim 1, wherein the reproduction means include a speaker.

19. The electronic magnifier of text according to claim 1, provided with first displacement means arranged for displacing at least part of the registration means with respect to the text and with respect to a part of the reproduction device in response to the registered position of the indication body.

20. The electronic magnifier of text according to claim 19, wherein the first displacement means include a motor.

21. The electronic magnifier of text according to claim 1, wherein the registration means are rigidly positioned in the reproduction device.

22. The electronic magnifier of text according to claim 21, wherein the registration means are arranged to optically register the text.

23. The electronic magnifier of text according to claim 1, wherein the signal processing means are arranged to select the text portion from the text in response to the determined position of the indication body.

24. The electronic magnifier of text according to claim 1, wherein the registration means include a camera.

25. The electronic magnifier of text according to claim 1, wherein the registration means are arranged to also register at least part of the indication body and to reproduce this at least partly together with the processed registered image portion.

26. The electronic magnifier of text according to claim 1, wherein the localization means include an engagement element arranged to engage with the indication body.

27. The electronic magnifier of text according to claim 1, provided with second displacement means arranged to displace the reproduction device in use with respect to the text.

28. The electronic magnifier of text according to claim 27, wherein the second displacement means include a rotatable roller.

29. The electronic magnifier of text according to claim 1, provided with a housing that at least partly surrounds the registration means, the reproduction means, and the electronic signal processing means.

30. The electronic magnifier of text according to claim 29, wherein the housing is provided with an entrance opening in which at least part of the indication body can be placed.

31. The electronic magnifier of text according to claim 1, provided with a support member for placing the text there against.

32. The electronic magnifier of text according to claim 1 and an indication body.

33. The electronic magnifier of text according to claim 32, wherein the indication body is at least partly transparent.

34. A method for electronically magnifying text comprising the steps of:

optically registering a desired portion of the text on paper with a registration means;

processing at least the registered text portion of the desired portion of the text with an electronic signal processing means; and determining a position of an indication body that is moveable with respect to the text and with respect to at least a part of the reproduction device with a contactless localization means;

selecting a position of the registered text portion in response to the determined position of the indication body; and reproducing and magnifying the processed selected registered text portion with a reproduction device.

35. The method according to claim 34, including registering a whole text, and wherein the selection of the position of the text portion is made by means of the processing of the registered whole text so as to obtain the text portion.

36. The method according to claim 34, including keeping the registration means fixed in the reproduction device.

37. The method according to claim 34, including moving at least part of the registration means, arranged for optically registering the text portion that is to be registered.

38. The method according to claim 37, wherein moving is carried out by means of a motor of the reproduction device.

* * * * *